United States Patent [19]

Miyamae

[11] Patent Number: 4,996,867
[45] Date of Patent: Mar. 5, 1991

[54] GOLF CLUB SWINGING APPARATUS

[76] Inventor: Toshiaki Miyamae, 9-15, 1-chome, Nakagawa-nishi, Ikuno-ku, Osaka, Japan

[21] Appl. No.: 330,137

[22] Filed: Mar. 29, 1989

[30] Foreign Application Priority Data

Dec. 9, 1988 [JP] Japan .......................... 63-160690[U]

[51] Int. Cl.⁵ .......................................... G01M 19/00
[52] U.S. Cl. ........................................ 73/13; 73/865.3
[58] Field of Search ................................ 73/13, 865.3

[56] References Cited
U.S. PATENT DOCUMENTS

3,444,729  5/1969  Shobert ............................. 73/13 X
3,855,842  12/1974  Iabori et al. ........................ 173/13
4,062,222  12/1977  Solheim ............................. 73/13

Primary Examiner—Charles A. Ruehl
Attorney, Agent, or Firm—Moonray Kojima

[57] ABSTRACT

This invention is concerned with a golf club swinging apparatus for testing performance of golf clubs, for example. The golf club swinging apparatus is capable of swinging a golf club from an addressing position through take-back, back swing top, down swing, impact and follow-through positions to a follow-through end position, which results in substantially the same club swinging locus as by a golfer. The club swinging apparatus therefore enables flight distance and various other tests to be conducted reliably.

1 Claim, 10 Drawing Sheets

GOLF CLUB SWINGING APPARATUS

SUMMARY OF THE INVENTION

This invention is concerned with a golf club swinging apparatus for testing performance of golf clubs, for example. The golf club swinging apparatus is capable of swinging a golf club from an addressing position through take-back, back swing top, down swing, impact and follow-through positions to a follow-through end position, which results in substantially the same club swinging locus as by a golfer. The club swinging apparatus therefore enables flight distance and various other tests to be conducted reliably.

BACKGROUND OF THE INVENTION

Conventionally, newly manufactured golf clubs are swung by professional golfers or other testers to check ball flight and various other aspects of the club performance. Such tests have the disadvantage that accurate performance data cannot be obtained because of the differences among the testers.

In order to eliminate this disadvantage, a golf club swinging apparatus as disclosed in U.S. Pat. No. 3,444,729 has been developed.

This apparatus comprises a sector-shaped pivot plate fixed to a shaft, and a gripper connected to the pivot plate through an arm for attaching a golf club to the forward end of the gripper. The shaft is meshed with a driven gear operatively connected to an electric motor through a drive gear, a chain and a sprocket, whereby the golf club is swung by the motor.

This prior apparatus includes a braking device for braking the driven gear when necessary. However, in the absence of means for controlling the rotational rate of the electric motor, the golf club is swung at an approximately constant speed throughout. The club swing effected by this swinging apparatus does not involve acceleration or deceleration similar to those occurring with a swing by a model player. It is thus difficult to carry out reliable ball flight and other desired tests with this apparatus.

Further, the prior apparatus does not include mechanical means for positively driving the gripper. This apparatus does not, therefore, assure a club swinging locus corresponding to that produced by a golfer in a normal playing situation.

OBJECTS OF THE INVENTION

A primary object of the present invention is to provide a golf club swinging apparatus which produces substantially the same club swinging locus and swinging speeds as by a model player such as a leading professional golfer, and is capable of acceleration, deceleration, and impact and follow-through actions of the golf club to enable reliable tests. This object is achieved by a golf club swinging apparatus comprising an arm base swingable by a servomotor about a pivotal shaft extending from a housing, a club holding arm connected to a free end of the arm base to be swingable in the same direction as the arm base through an angle about 1.5 times a swing angle of the arm base, and control means for controlling rotational rates of the servomotor.

Another object of the invention is to provide a golf club swinging apparatus which realizes movement of a golf club from a back swing top position to a follow-through end position corresponding to the wrist action of a model player, thereby allowing detailed test data to be obtained such as subtle angles of club faces and the like, and distributing stress evenly over the grip of the golf club to safeguard the golf club against breakage. This object is achieved by a golf club swinging apparatus wherein the club holding arm includes a chuck mechanism for removably securing a golf club, and twisting means for twisting the chuck mechanism through a predetermined angle clockwise as viewed from the pivotal shaft as the golf club is swung from a back swing top position to a follow-through end position.

Other objects of the present invention will be apparent from the following description.

BRIEF DESCRIPTION OF THE DRAWINGS

The drawings show an embodiment of the present invention, in which.

DESCRIPTION OF THE PREFERRED EMBODIMENT

An embodiment of the present invention will be described in detail hereinafter with reference to the drawings.

Figure 1:
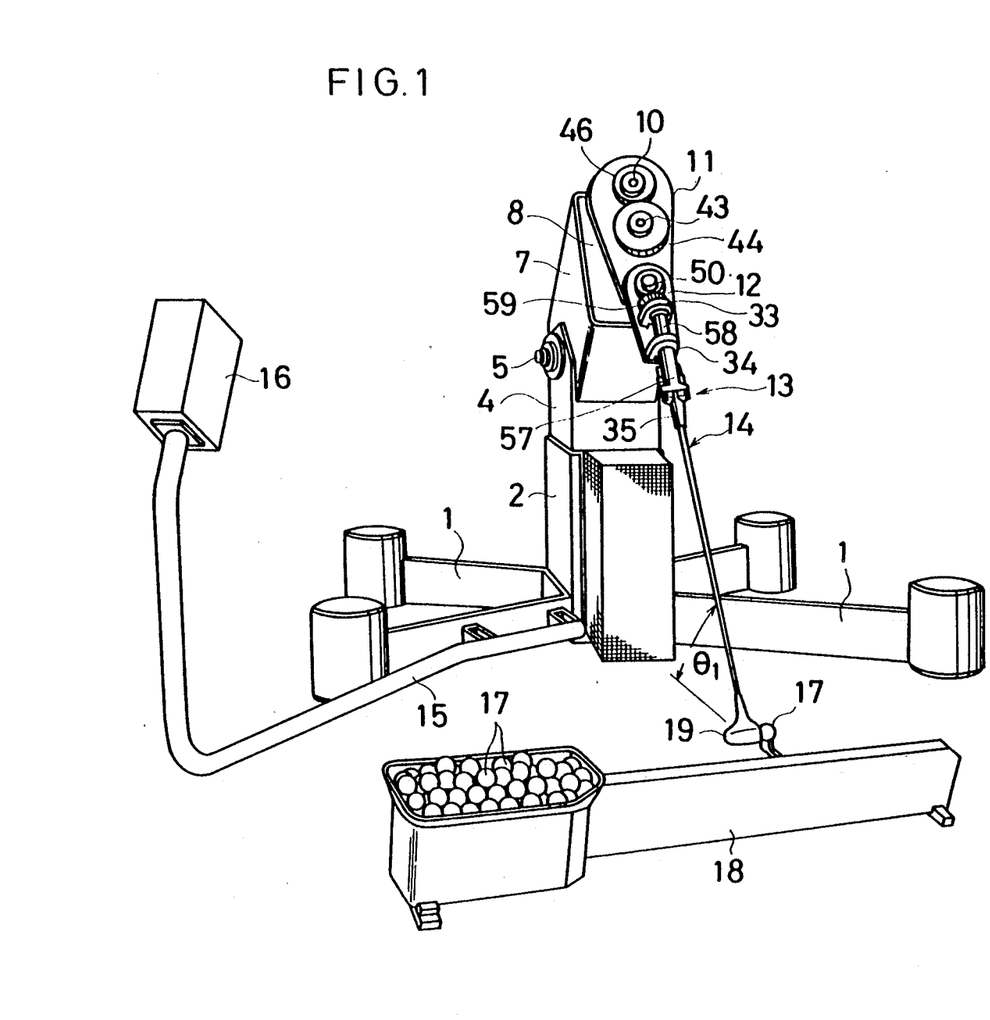
FIG. 1 is a schematic perspective view of a golf club swinging apparatus.
Figure 2:
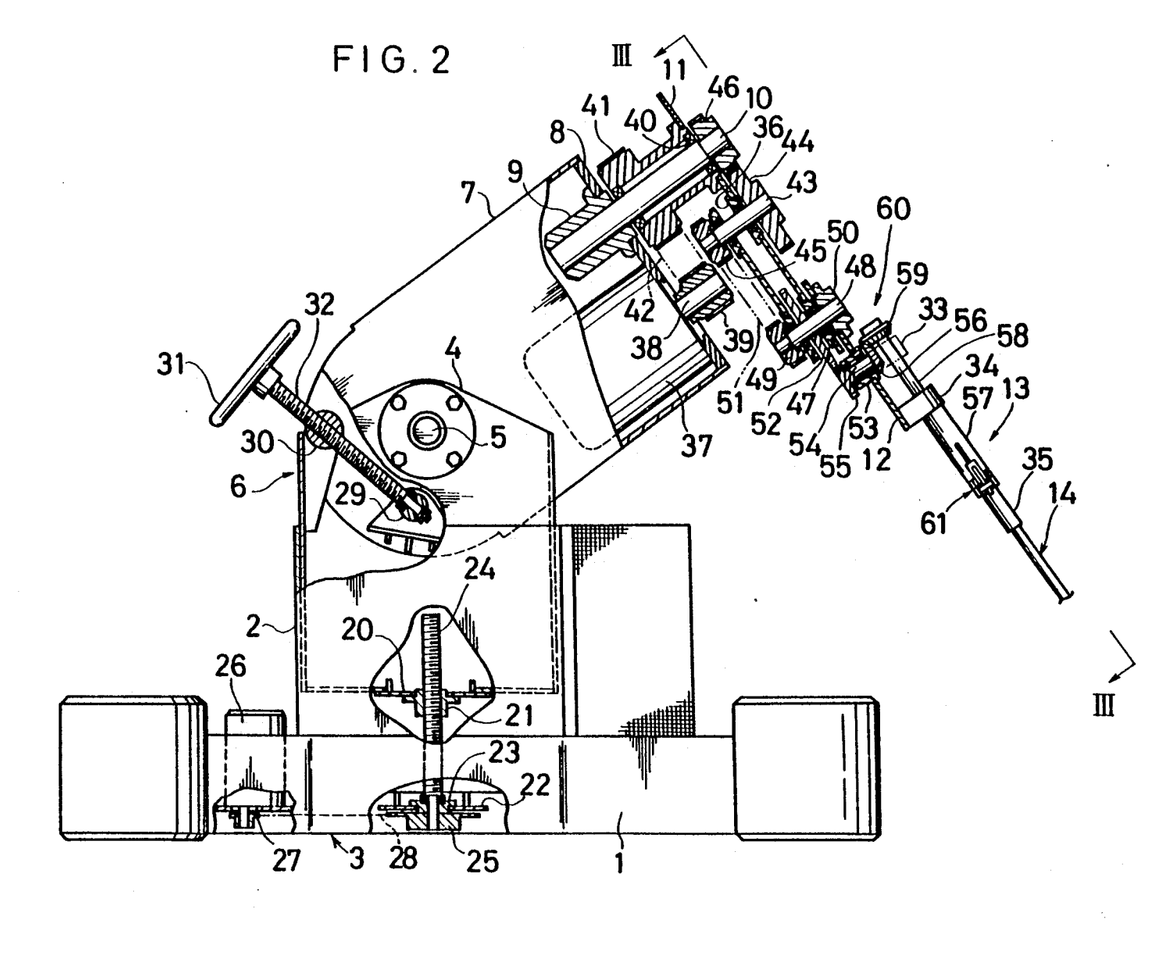
FIG. 2 is a sectional view of the golf club swinging apparatus.

As shown in FIGS. 1 and 2, a golf club swinging apparatus comprises a stand 2 erected and fixed between right and left legs 1. The stand 2 supports a casing 4 vertically adjustable by a lift device 3.

The casing 4 supports a housing 7 for which angle adjustment is made about a rotational axis 5 by an angle adjusting device 6.

The housing 7 includes a housing top 8 fixedly supporting a pivotal shaft 10 through a boss 9. An arm base 11 is connected to the pivotal shaft 10 to be pivotable thereon, the arm base 11 carrying a club holding arm 12 at a free end thereof. The arm 12 carries a chuck mechanism 13 which may be turned round for removably holding a golf club 14.

As shown in FIG. 1, a control box 16 is connected to one of the legs 1 through a hard metal pipe 15. Golf balls 17 are automatically fed by an automatic ball feeder 18 to an impact position opposed to the face of a club head 19.

Referring to FIG. 2, the lift device 3 includes a jacking bolt 24 extending vertically between an upper jack bearing 21 fixed to a bottom plate 20 of the casing 4 and a lower jack bearing 23 fixed to a base plate 22. The jacking bolt 24 carries a driven sprocket 25 at a lower end thereof, which is operatively connected through a chain 28 to a drive sprocket 27 fitted on a rotary shaft of a reversible motor 26. Thus, forward and backward rotations of the reversible motor 26 drive the casing 4 up and down along inside walls of the stand 2.

The angle adjusting device 6 includes a control wheel 31 attached to a screw 32 extending between a first angle shaft 29 in the housing 7 and a second angle shaft 30 in the casing 4. By turning the wheel 31, an adjustment is made of a lie or angle $\theta 1$ shown in FIG. 1.

As shown in FIGS. 1 and 2, the chuck mechanism 13 is supported through bearings 33 and 34 at an upper and a lower positions on an outer surface of the club holding arm 12. The chuck mechanism 13 is rotatably supported for removably holding the grip 35 of golf club 14.

The housing 7 contains an AC servomotor 37 such as a two-phase induction motor or the like attached to an inside surface of the housing top 8.

The AC servomotor 37 has an output shaft 28 carrying an output gear 39.

On the other hand, the pivotal shaft 10 carries an input gear 41 mounted for relative rotation thereon through bearings 40. A timing belt 42 is wound around the input gear 41 and the output gear 39. The arm base 11 is fixed to an upper end of the input gear 41.

An intermediate shaft 43 is journaled through a bearing 36 in an intermediate position of the arm base 11. The intermediate shaft 43 carries a planetary gear 44 at an upper end, and a timing pulley 45 at a lower end thereof.

The pivotal shaft 10 carries a sun gear 46 fixed thereto against rotation. The planetary gear 44 is in constant mesh with the sun gear 46, with the gear ratio between the sun gear 46 and the planetary gear 44 set to about 1:1.5. As a result, the club holding arm 12 is driven in the same direction as the arm base 11 with a swing angle about 1.5 times that of the arm base 11.

An arm swing shaft 48 is journaled in a free end of the arm base 11 through a bearing 47. The arm swing shaft 48 carries a timing pulley 49 at a lower end, and the club holding arm 12 fixed through a boss 50 to an upper end thereof.

A timing belt 51 is wound around the timing pulley 48 on the arm swing shaft 48 and the timing pulley 45 on the intermediate shaft 43. The pulley ratio between the two timing pulleys 45 and 49 are set to 1:1.

Figure 3:
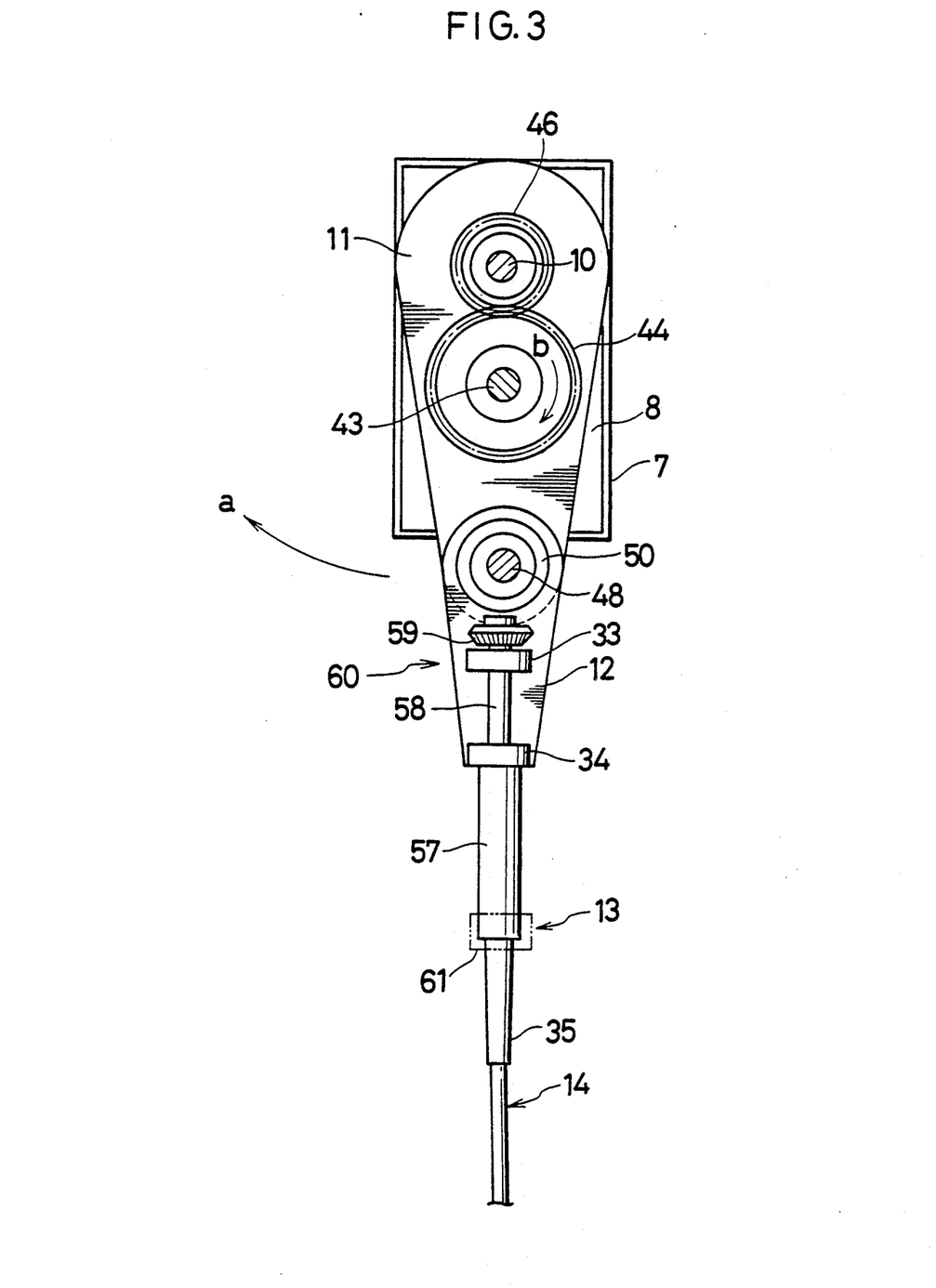
FIG. 3 is a section taken on line III—III of FIG. 2.

As shown in FIG. 3, this apparatus is designed such that the arm base 11 and the club holding arm 12 are aligned in an impact applying or ball striking position.

Figure 4:
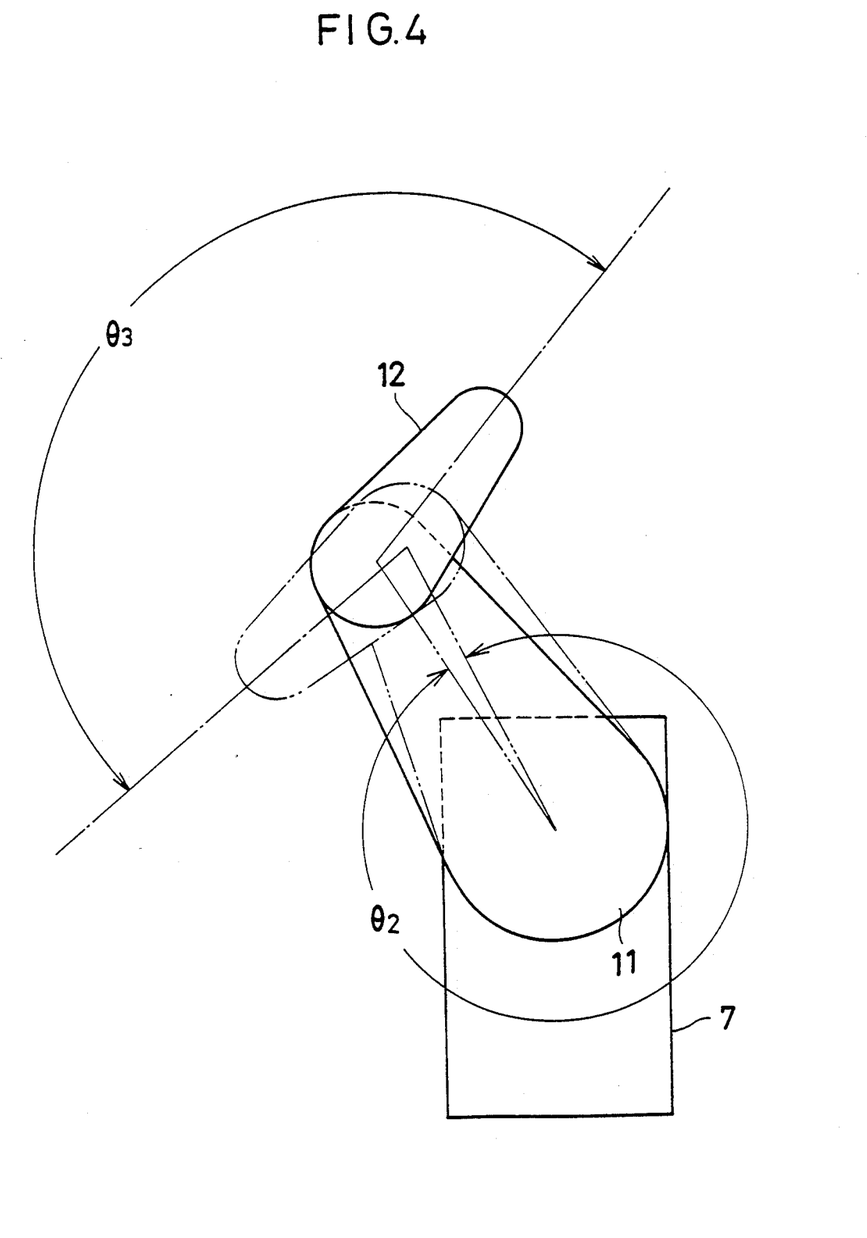
FIG. 4 is an explanatory view of swinging loci.
Figure 5:
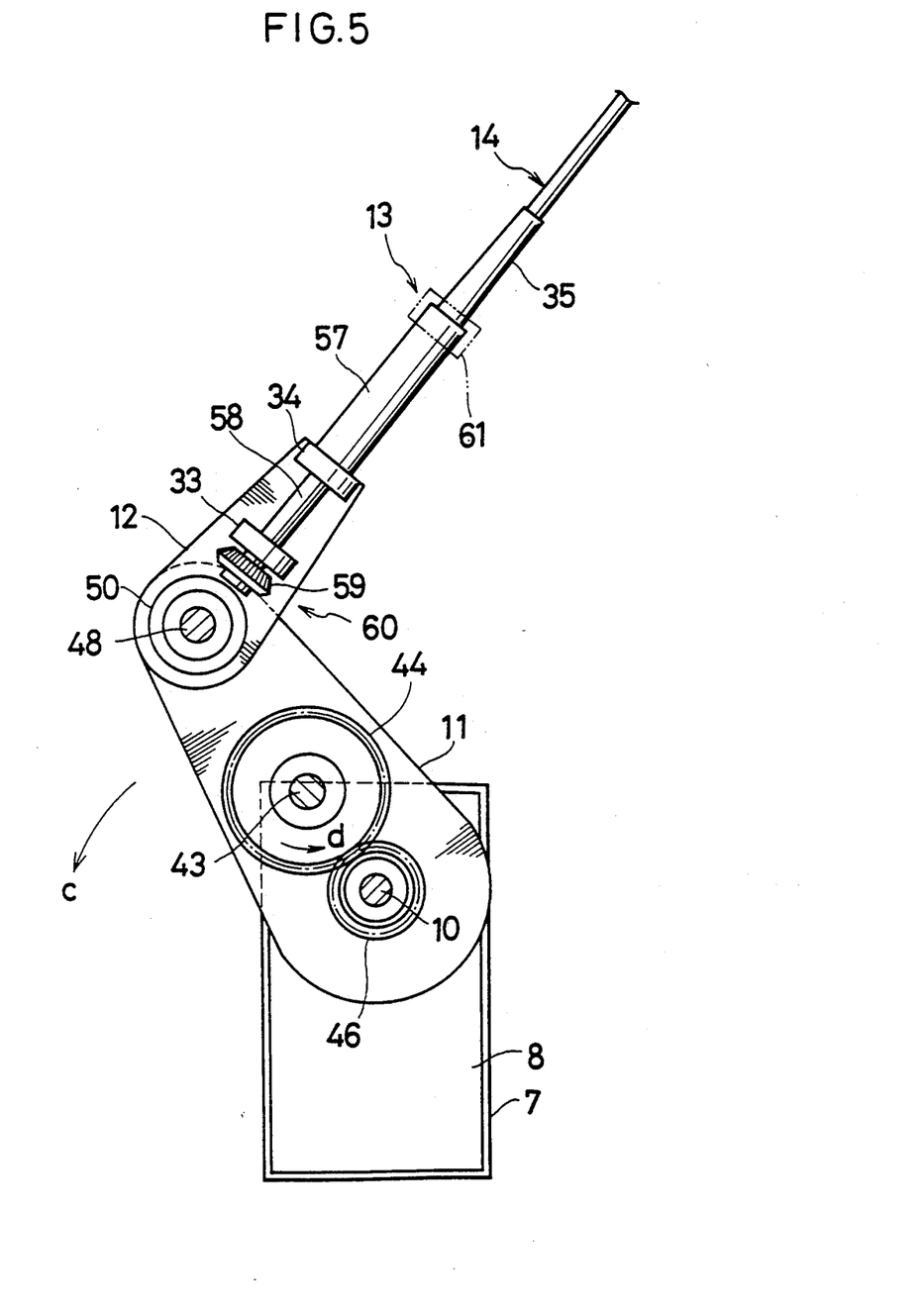
FIG. 5 is a view showing a back swing top position.

Since the gear ratio between the sun gear 46 and the planetary gear 44 is set to about 1:1.5 as noted above, the opening angle between the arm base 11 and the club holding arm 12 is 100–110 degrees in a back swing top position shown in solid lines in FIGS. 4 and 5. In a follow-through end position shown in phantom lines in FIG. 4 and solid lines in FIG. 6, the opening angle between the arm base 11 and the club holding arm 12 is 250–260 degrees.

In other words, the arm base 11 has a swing angle $\theta 2$ of about 350 degrees whereas the club holding arm 12 has a swing angle $\theta 3$ of 360 plus about 170 degrees which are about 530 degrees.

As shown in FIG. 2, the arm swing shaft 48 carries a relatively large spur gear 52 at an intermediate position thereof. The club holding arm 12 carries a gear shaft 54 at a longitudinally intermediate position thereof through a bearing 53. The gear shaft 54 includes a relatively small spur gear 55 fixed to a lower end, and a first bevel gear 56 fixed to an upper end thereof, the spur gear 55 being in constant mesh with the above spur gear 52.

The chuck mechanism 13, which includes a sleeve shaft 57 at a distal end and a turn or twisting shaft 58 at a proximal end thereof, is supported by the upper and lower bearings 33 and 34 as noted hereinbefore. The turn shaft 58 carries a second bevel gear 59 mounted at an upper end thereof, which gear 59 is in constant mesh with the first bevel gear 56, thereby constituting a twisting mechanism 60.

The twisting mechanism 60 twists the chuck mechanism 13 clockwise from the back swing top position (FIG. 5) to the follow-through end position (FIG. 6) through a predetermined angle as viewed from the pivotal shaft 10. Thus, the twisting mechanism 60 accomplishes a movement corresponding to the wrist action of a model player.

Figure 7:
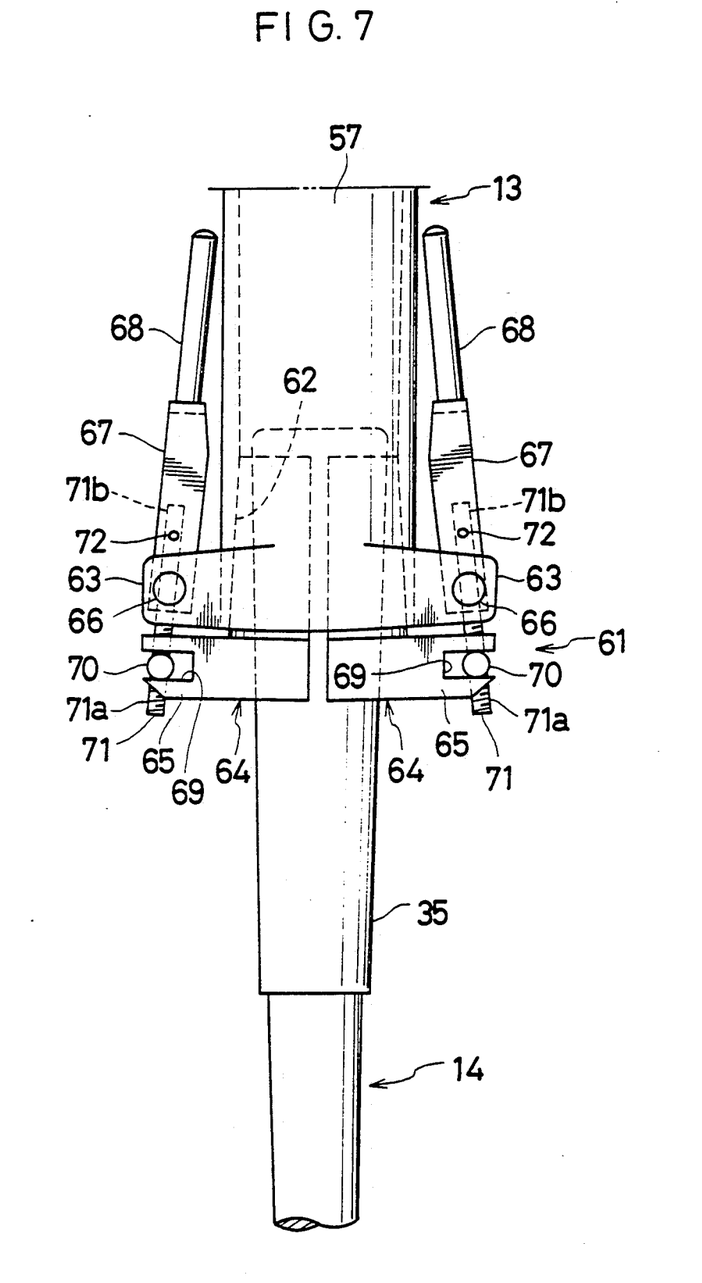
FIG. 7 is an explanatory view of a chuck section.
Figure 8:
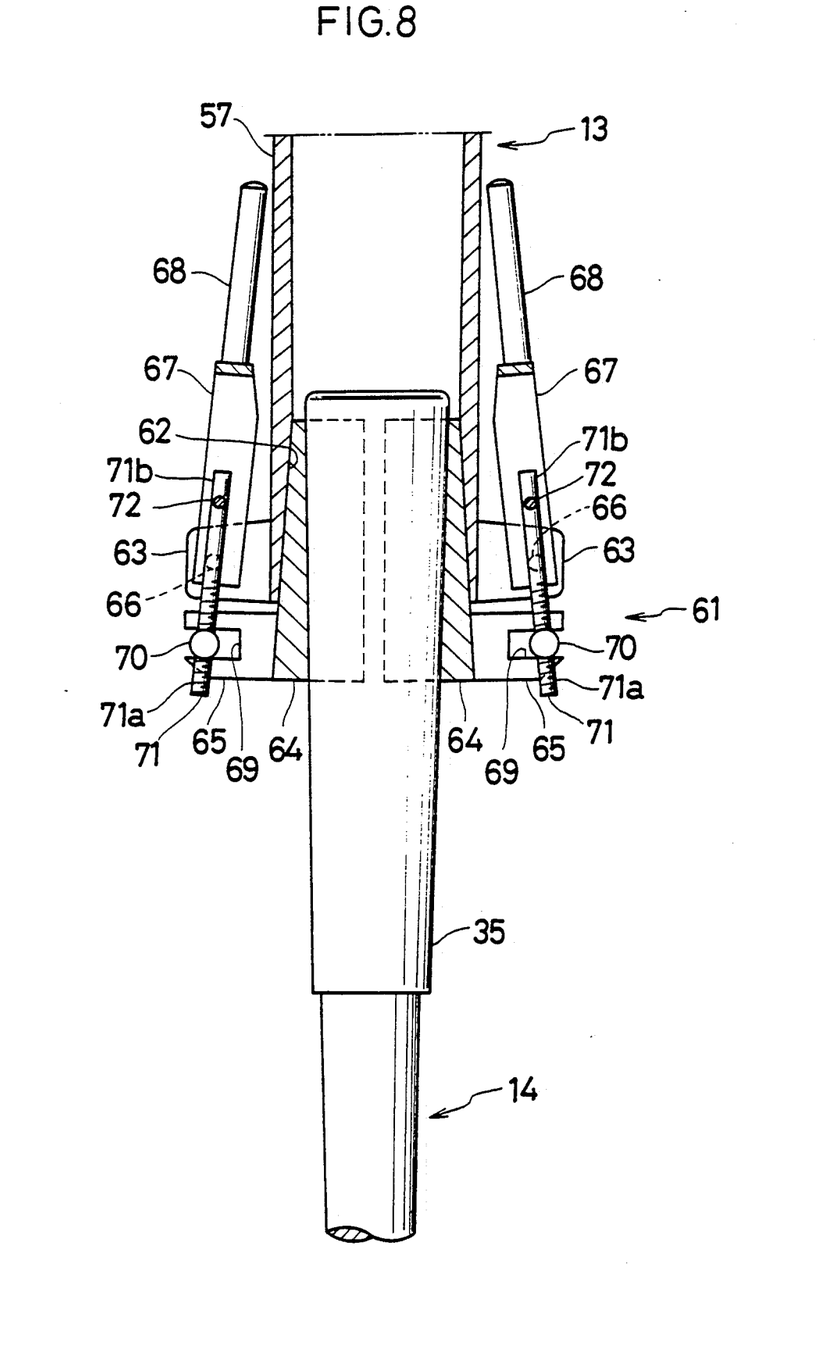
FIG. 8 is a sectional view of the chuck section.
Figure 9:
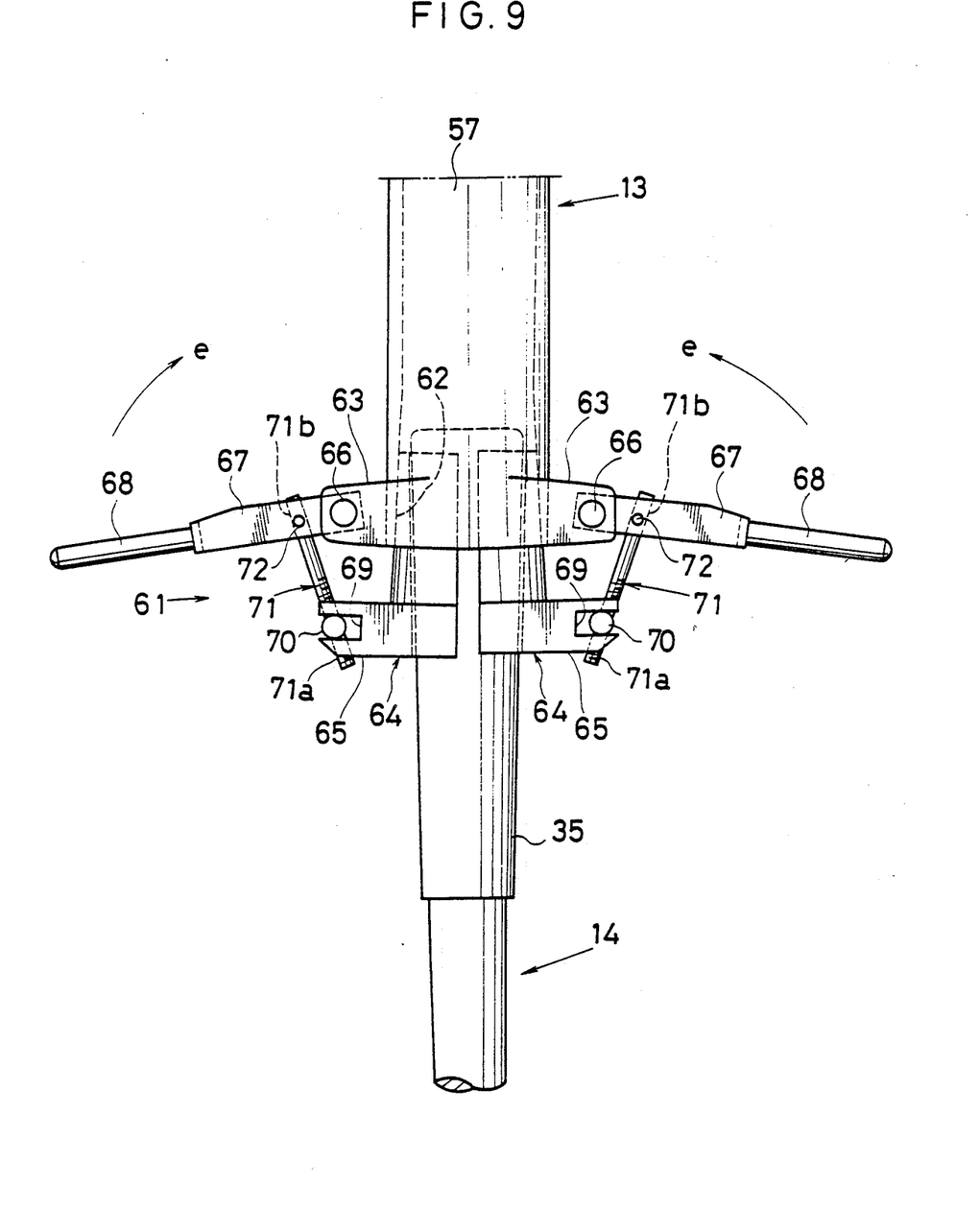
FIG. 9 is an explanatory view of the chuck section in an open, non-clamping position.

The chuck mechanism 13 includes a chuck section 61 as shown in FIGS. 7, 8 and 9.

The chuck section 61 includes a tapered hole 62 defined in a forward end of the sleeve shaft 57, projections 63 integrally projecting from opposite sides of the sleeve shaft 57, split chuck pieces 64 having an inner periphery corresponding to the grip 35 of the golf club 14 and an outer periphery in a taper cone shape, projections 65 integrally projecting laterally outwardly from the respective chuck pieces 64, chuck levers 67 each pivotable about a pivotal axis 66 included in the projection 63 of the sleeve shaft 57, control levers 68 each rigidly connected to one end of each chuck lever 67, pivots 70 each disposed in a channel-shaped recess 69 defined in the projection 65 of each chuck piece 64, and rods 71 each having a threaded portion 71a extending through the pivot 70 and a proximal end 71b connected through a pivot pin 72 to each chuck lever 67. The grip 35 of the golf club 14 is inserted between the chuck pieces 64 in an open, non-clamping position as shown in FIG. 9. Then the chuck levers 67 are turned about the pivotal axes 66 in directions of arrows e in FIG. 9, whereby the chuck pieces 64 become clamped along the inside wall of the tapered hole 62. Consequently, the grip 35 of the golf club 14 may rigidly be held in position as shown in FIGS. 7 and 8 through a one-touch operation.

Figure 10:
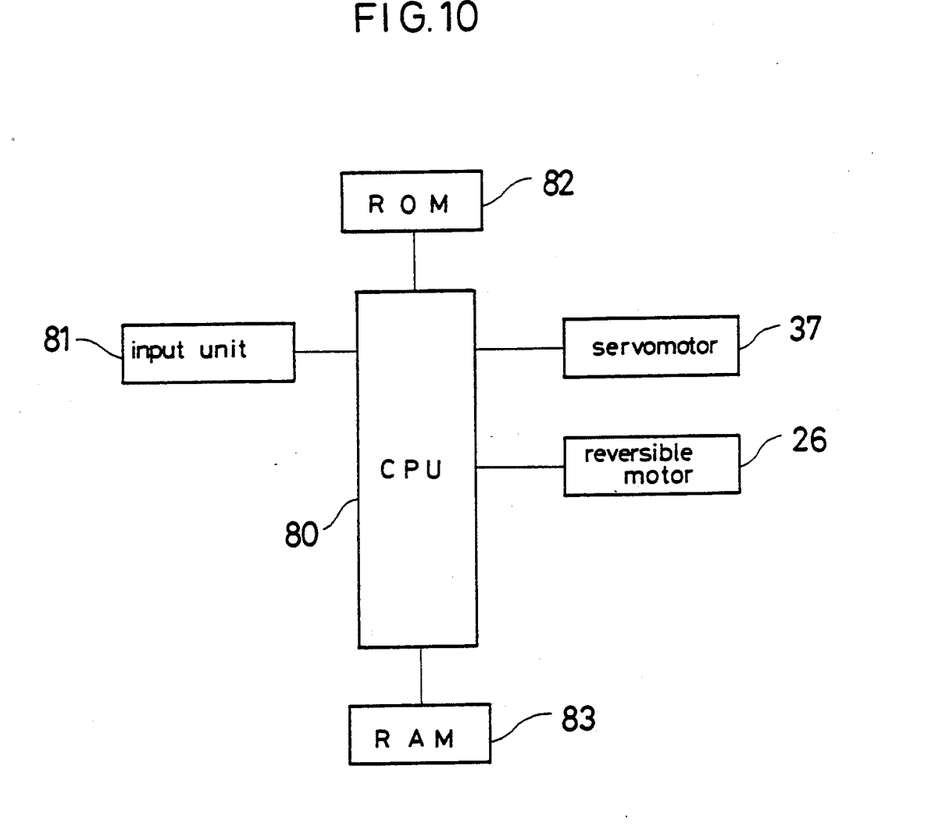
FIG. 10 is a block diagram of a control circuit.

FIG. 10 illustrates a control circuit for the described golf club swinging apparatus. The control circuit includes a CPU 80 which actuates the reversible motor 26 and the servomotor 37 in response to inputs made through an input unit 81 and following a program stored in a ROM 82. A RAM 83 is provided for storing levels of control current supplied to the servomotor 37 for accelerating and decelerating portions of a golf club swing, which levels are determined according to the types of golf club 14 such as woods and irons.

The CPU 80 acts as a control unit for controlling the rotational rate of the servomotor 37 for each stage from an addressing position through take-back, back swing top, down swing, impact and follow-through positions to the follow-through end.

How the illustrated embodiment operates will be described hereinafter.

Upon receipt of a signal from the input unit 81, the CPU 80 drives the servomotor 37 at a predetermined rate to swing the arm base 11 from the position shown in FIG. 3 in the direction of arrow a.

At this time, the CPU 80 reads from the RAM 83 the swinging speed of the arm base 11 for acceleration.

With the swinging motion in the direction of arrow a of the arm base 11, the planetary gear 44 rotates in the direction of arrow b along the stationary sun gear 46. As a result, the opening angle between the arm base 11 and the club holding arm 12 becomes 100-110 degrees in the back swing top position shown in FIG. 5.

During the swinging motion to the back swing top position, the golf club 14 is twisted in an appropriate direction by the twisting mechanism 60.

Then the CPU 80 drives the servomotor 37 again, to swing the arm base 11 from the position shown in FIG. 5 in the direction of arrow c.

At this time, the CPU 80 reads from the RAM 83 the swinging speeds of the arm base 11 for deceleration and impact.

With the swinging motion in the direction of arrow c of the arm base 11, the planetary gear 44 rotates in the direction of arrow d along the stationary sun gear 46. As a result, the club head 19 at the forward end of the golf club 14 strikes a golf ball 17. Thereafter, the arm base 11 arrives at the follow-through end position shown in FIG. 6, in which the opening angle between the arm base 11 and the club holding arm 12 is 250-260 degrees.

Figure 6:
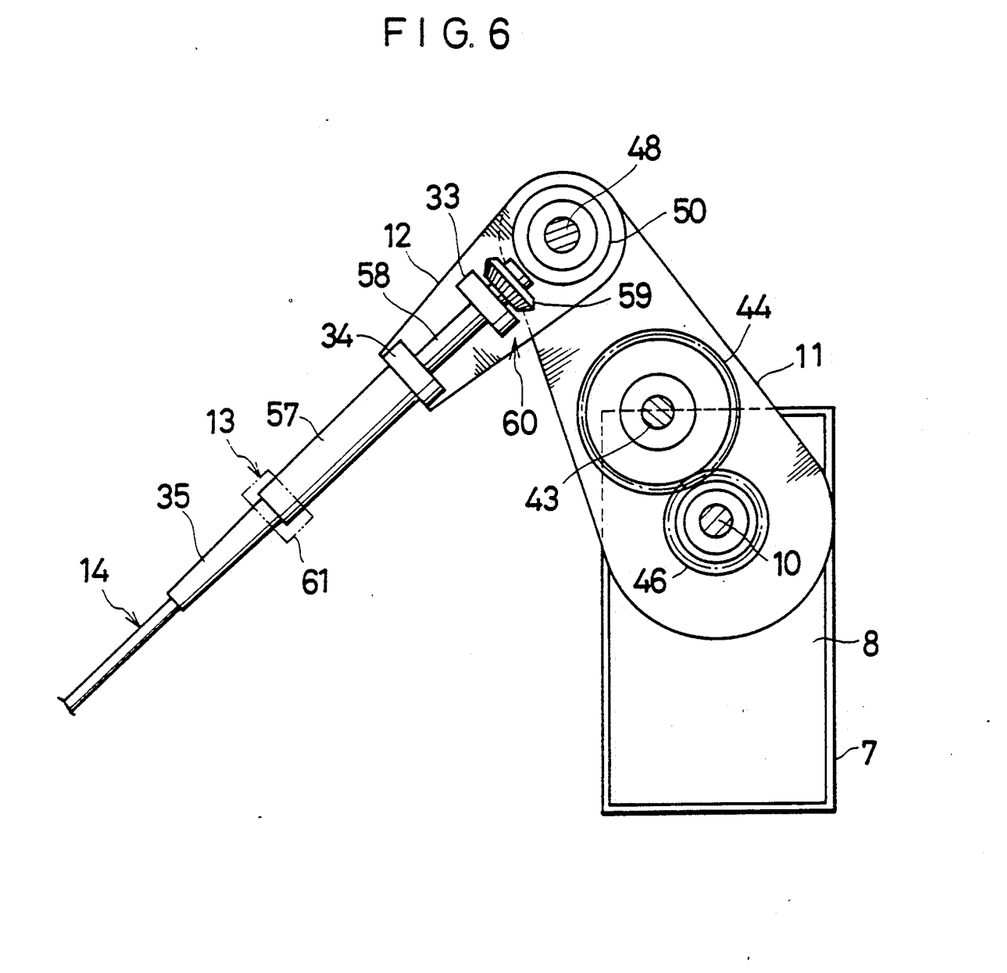
FIG. 6 is a view showing a follow-through end position.

During the swinging motion from the back swing top position to the follow-through end position too, the golf club 14 is twisted in an appropriate direction by the twisting mechanism 60.

As described above, the club holding arm 12 is swung in the same direction as the arm base 11 and through about 1.5 times the swing angle of the arm base 11. And the club holding arm 12 becomes aligned with the arm base 11 at the impact or ball striking position. Consequently, a slow back swing, an impact portion at maximum speed and a slowed down follow-through motion follow substantially the same club swinging locus as by a model player. The club swinging apparatus therefore enables reliable flight distance and other tests.

Further, since the arm base 11 is driven by the servomotor 37, the swing of the golf club 13 fixed thereto through the club holding arm 12 may be accelerated and decelerated in accordance with the drive speeds of the servomotor 37.

In other words, the AC servomotor 37 rotates a rotor in a selected direction at a rotational rate proportional to the control current. The club swing may, therefore, be accelerated and decelerated by controlling the control current in accordance with the back swing, impact applying and follow-through motions.

Moreover, the golf club 14 is twisted with the chuck mechanism 13 in a selected direction by means of the meshing between the gears 52 and 55 and between the bevel gears 56 and 59 as the golf club 14 is swung from the addressing position through the take-back, back swing top, down swing, impact and follow-through positions to the follow-through end. This club swinging apparatus, therefore, realizes a movement corresponding to the wrist action of a model player, thereby allowing detailed test data to be obtained such as subtle angles of club faces and the like.

The twisting action applied by the twisting mechanism 60 to the golf club 14 produces the effect of distributing stress evenly over the grip 35 of the golf club 14. This feature safeguards the golf club 14 against breakage.

In the appended claims, the term "control means" corresponds to the CPU 20 in the foregoing embodiment. Similarly, the term "twisting means" corresponds to the twisting mechanism 60 including the bevel gears and other components. It is to be noted, however, that the present invention is not limited to the described embodiment.

What is claimed is:

1. A golf club swinging apparatus comprising:

a housing;

a servomotor disposed within said housing;

means for controlling operation of said servomotor;

a rotatable shaft operated by said servomotor and extending from said housing;

a first arm device having two ends, one end thereof connected to and driven by said rotatable shaft so as to be rotated a first angle;

a second arm device having two ends, one end thereof connected rotatably to a second end of said first arm device so as to be rotatable in the same direction as said first arm device at a second angle which is 1.5 times that of said first angle;

holder means connected to a second end of said second arm device for removably holding a golf club; and means for rotating said holder means at an third angle as viewed from said rotatable shaft as the golf club is swung from a back swing position to a follow through position;

whereby said golf club is swung by said apparatus in substantially the same swinging locus as that produced by a human.

* * * * *